US009346086B2

(12) United States Patent
Teruggi (10) Patent No.: US 9,346,086 B2
(45) Date of Patent: May 24, 2016

(54) MACHINE AND METHOD FOR CONTINUOUS REMOVAL OF LABELS FROM CONTAINERS MADE OF PLASTIC MATERIALS (71) Applicant: AMUT S.P.A., Novara (IT)

(72) Inventor: Piergiorgio Teruggi, Novarra (IT)

(73) Assignee: AMUT S.p.A. (IT)

( * ) Notice: Subject to any disclaimer, the term of this patent is extended or adjusted under 35 U.S.C. 154(b) by 0 days.

(21) Appl. No.: 14/443,420

(22) PCT Filed: Jul. 25, 2013

(86) PCT No.: PCT/IB2013/001612
§ 371 (c)(1),
(2) Date: May 18, 2015

(87) PCT Pub. No.: WO2014/083393
PCT Pub. Date: Jun. 5, 2014

(65) Prior Publication Data
US 2015/0290687 A1 Oct. 15, 2015

(30) Foreign Application Priority Data

Nov. 27, 2012 (EP) .................................. 12007976

(51) Int. Cl.
B32B 38/10 (2006.01)
B08B 9/08 (2006.01)
B08B 9/38 (2006.01)
B32B 43/00 (2006.01)

(52) U.S. Cl.
CPC . *B08B 9/083* (2013.01); *B08B 9/38* (2013.01); *B32B 43/003* (2013.01); *B32B 43/006* (2013.01); *B32B 38/10* (2013.01); *Y10T 83/0289* (2015.04); *Y10T 83/037* (2015.04); *Y10T 83/0596* (2015.04); *Y10T 83/2103* (2015.04); *Y10T 83/2109* (2015.04); *Y10T 83/6473* (2015.04); *Y10T 83/8791* (2015.04);
(Continued)

(58) Field of Classification Search
CPC ............ B32B 43/006; Y10T 156/1184; Y10T 156/1967; Y10T 83/0289; Y10T 83/037; Y10T 83/0596; Y10T 83/2109; Y10T 83/2103; Y10T 83/6473; Y10T 83/8791; Y10T 83/8794; Y10T 83/9304; Y10T 83/9319; Y10T 83/9329; Y10T 83/9377; Y10T 83/9391
USPC ............. 156/717, 762; 83/116, 481, 490, 872
See application file for complete search history.

(56) References Cited

U.S. PATENT DOCUMENTS 2,516,998 A * 8/1950 Kimball .................. B08B 9/083
134/68
4,013,497 A * 3/1977 Wolf ....................... B08B 9/083
15/59

(Continued)

FOREIGN PATENT DOCUMENTS

DE 19618363 A1 6/1997
EP 2050516 4/2009
(Continued)

Primary Examiner — Mark A Osele
Assistant Examiner — Nickolas Harm
(74) Attorney, Agent, or Firm — Hess Patent Law Firm LLC; Robert J. Hess (57) ABSTRACT A machine and a method for the continuous removal of labels from plastic containers made of recyclable material are described. The machine comprises a fixed treatment chamber in which an agitator provided with a plurality of vanes is rotated. Toothed plates are mounted in a removable way on at least one of the flat surfaces of each of the vanes.

17 Claims, 10 Drawing Sheets (52) U.S. Cl.
CPC .......... *Y10T83/8794* (2015.04); *Y10T 83/9304* (2015.04); *Y10T 83/9319* (2015.04); *Y10T 83/9329* (2015.04); *Y10T 83/9377* (2015.04); *Y10T 83/9391* (2015.04); *Y10T 156/1184* (2015.01); *Y10T 156/1967* (2015.01)

(56) References Cited

U.S. PATENT DOCUMENTS

| | | | | |
|---|---|---|---|---|
| 4,599,131 | A | * | 7/1986 | Matuszak ............... B08B 9/083 15/60 |
| 5,152,865 | A | * | 10/1992 | Hurst ...................... B08B 9/083 15/236.01 |
| 8,479,797 | B1 | * | 7/2013 | Hurst ...................... B08B 9/083 156/717 |

FOREIGN PATENT DOCUMENTS

| | | |
|---|---|---|
| EP | 2050516 A1 | 4/2009 |
| JP | H-1199523 | 4/1999 |
| WO | WO 2012/040763 A2 | 4/2012 |
| WO | WO/2014/083393 | 6/2014 |

* cited by examiner

MACHINE AND METHOD FOR CONTINUOUS REMOVAL OF LABELS FROM CONTAINERS MADE OF PLASTIC MATERIALS

FIELD OF THE INVENTION

The present invention relates to a machine for the treatment of plastic containers of recyclable type, such as for example bottles for water, beverages or the like made of PET or other recyclable plastic materials. In particular, the present invention relates to a machine that enables the continuous removal of plastic and paper labels from the surface of plastic containers or bottles.

STATE OF THE ART

Plastic containers having one or more recyclable parts are generally subjected to one or more treatment steps that enable the recovery of the required recyclable plastic materials.

In case of PET containers, the known art proposes to carry out at least one pre-washing or washing step with a heated fluid, if necessary in combination with steam at high temperature, to remove the waste materials consisting for example of any paper or plastic labels affixed to the containers.

In recent times, PET bottles covered, fully or partly, with shrink-wrap plastic sleeves or wrappers in materials other than PET, such as PV, PETG or PE, with colored and/or printed surfaces, are becoming more widely used on the market. These new types of shrink-wrap sleeves or wrappers that cover the bottles represent a problem for prior art systems which operate with a heated, or high temperature, washing fluid.

In fact, shrink-wrap plastic sleeves and wrappers subjected to heating tend to contract further, and therefore to mostly adhere to the outer surface of the containers. Taking into account that the containers to be treated are generally deformed, crushed and twisted, the removal of these sleeves wrapped around the containers is very difficult.

In case in which the sleeves or wrappers adhering to the containers are not removed, the containers themselves, although clean, could be rejected during the subsequent automatic steps to sort materials to be recycled (e.g. PET) from those rather considered contaminants (e.g. PVC, PETG or PE). In fact, the automatic sorting is generally carried out by optical systems that could interpret containers still covered by sleeves as containers made of materials different from the material to be recycled.

Various dry and wet techniques have been proposed to date for the removal of plastic and paper labels. Some dry techniques for the removal of labels from bottles made of material to be recycled are described, for example, in DE-A1-19618363, in JP-A-11099523 and in WO2012/040763 A2. However, these documents provide obligatory steps for the bottles so that sharp cutting means can act axially on the labels adhering to the surface of the bottles. In other words, obligatory steps are for example provided wherein the bottle is inserted between a fixed part and a blade or movable knife. The machines using these techniques can only treat a limited flow of bottles as the labels can only come into contact with the cutting means in this way.

Naturally this limits the flow rate of bottles and, consequently, the production levels obtainable with these techniques, unless machines of large size are produced or several machines operating in parallel are arranged in a same plant.

All of the prior art documents suggest to employ sharp blades and/or knives for effectively acting on the labels, making cuts mainly oriented along directions parallel to the axis of the bottles. However, the efficiency of the sharp cutting means is quickly impaired by the wear of the cutting edge of blades and frequent maintenance and/or replacement services of the plates themselves are required.

This results in the machine stop for the time required to replace or sharpen again the blades and, in addition, in high intervention costs if the operations become laborious. For example, document WO2012/040763 A2 provides cutting means consisting of sharp knives projecting from longitudinal seats obtained on rotating rollers and aligned in parallel to the rotation axis of the rollers. The attachment of each longitudinal knife, extending substantially along the whole length of the roller, is obtained by a plurality of screws engaging in the nut threads obtained in a bar loosely housed inside the roller. A helicoidal spring and a countercheck element thereof are further inserted on each screw that fixes the knives, so that the knife can have a certain limited play. Such a complex fixing system evidently becomes inconvenient in case wherein the knives have to be removed to be replaced or sharpened again.

The European patent application No. EP-2050516, by the same Applicant, proposes a machine and a method for the removal of labels and such contaminants from PET containers during the washing step. The treatment is performed continuously and is carried out with a washing fluid, such as an aqueous solution, which however is not heated such as to prevent further shrinkages of the shrink-wrap sleeves on the containers. Therefore, the unheated washing fluid enables to soften paper labels without affecting those made of shrink-wrap plastic.

Tearing means are provided in the machine which allow to "scratch" the plastic sleeves and paper labels so as to cause, or at least facilitate, the detachment thereof from the surface of the container. The tearing means consist of pointed elements screwed on the vanes and/or the inner wall of the washing chamber.

Although the efficiency of this solution has been recognized in the removal of paper labels and shrink-wrap plastic sleeves, a certain difficulty has been encountered in maintenance operations of the single pointed elements projecting from the vanes and/or walls of the chamber. In fact the replacement requires to necessarily unscrew each single pointed element and to screw back on a new pointed element.

Alternatively, the recovery of the sharp pointed element by grinding requires the intervention on each single pointed element and a new adjustment of the projection from the fixing surface.

Based on these observations, the tearing means proposed through the European patent application No. EP-2050516, although being effective, result in very large times and maintenance costs.

SUMMARY OF THE INVENTION

In general the object of the present invention is to propose a machine and a method which enable the efficacious continuous removal of labels of any type, whether plastic or paper, from the plastic containers to which they are affixed.

A particular object of the present invention is to propose a machine and a method of the aforementioned type which enable to render quick and easy the maintenance services on the means for making cuts to the labels.

Another object of the present invention is to render safer the installation and maintenance services of the means for making cuts to the labels.

These objects are reached by the present the invention by virtue of a machine according to claim 1 and a method according to claim 11. Further specific characteristics of the machine and method according to the present invention are described in the corresponding dependent claims.

According to a first aspect of the present invention, a machine is provided for the continuous removal of labels from the surface of plastic containers, comprising: a fixed treatment chamber having an inlet for the containers to be treated, at least one outlet for the containers with the labels removed and at least one portion of perforated wall for the expulsion of the removed labels; at least one agitator rotating inside the treatment chamber, the agitator having a plurality of vanes distributed along the rotor of the agitator and provided with at least two opposite flat surfaces; and means for making cuts to the labels adhering to the surface of the containers during the transit thereof inside the treatment chamber.

Advantageously the present invention proposes a machine wherein the means for making cuts to the labels comprise one or more toothed plates mounted in a removable way on at least one of the flat surfaces of each of said vanes.

Here and in the following with the generic definition "toothed plates" is also intended to identify the so called "serrated plates".

A machine according to the present invention can treat significant flows of containers. In fact, unlike systems for the removal of labels from bottles described in the prior art, the more bottles are present the better the machine operates, as the bottles themselves, nonetheless being fed haphazardly and randomly to the treatment chamber, tend to arrange in the more suitable position for being subjected to cuts in a direction orthogonal to the axis of the bottles themselves. The invention is therefore suitable to treat large numbers of bottles or containers with a single machine of compact size, whereas according to the prior art, to achieve the same level of production, for example, a plurality of machines in parallel or single large sizes machines were necessary.

With trials it has indeed found that there are several factors able to affect an effective removal of the plastic labels from the bottles.

Firstly the plastic labels and, especially, the shrink-wrap sleeves are realized for technical reasons with a mono-oriented film which naturally allows only radially shrink-wrapability around the bottle. Accordingly, the sleeves have a strong resistance against the cutting action along directions parallel to the axis of the bottle, whereas orthogonally to this axis the label is fragile and easy to cut. Therefore, by randomly hitting the bottles with toothed cutting means, the engraving of the labels always follows the fragility direction, that is to say the direction orthogonal to the axis of the bottle. On the other hand, the more resistant direction, that is to say that parallel to the axis of the bottle, needs an engraving strength so much higher that the bottle itself could be cut, which is unacceptable not only in the processes intended for the recycling of the bottle, but also in the processes for recovering the recycling material of the bottle.

In fact, if in this step the bottle is broken or fragmented in smaller pieces, the chips could be ejected along with the labels thus reducing the overall production levels of the plant.

Secondarily it has been observed that, by randomly loading the bottles in a horizontal cylinder and maintaining them under continuous agitation, each bottle always arranges with their own axis parallel to the axis of the cylinder for geometrical reasons, irrespective of their deformation conditions. Therefore it becomes unlikely that the scratching action of the toothed plates rotated around the agitator axis, coincident with the axis of the treatment chamber, can occur in the direction parallel to the axis of each bottle.

According to a possible embodiment of the present invention, each toothed plate includes at least one toothed profile projecting from the tangential edge of the vane on which it is mounted.

Alternatively, or in combination, each toothed plate includes at least one toothed profile projecting from the radial edge of the vane on which it is mounted.

According to a possible embodiment, each toothed plate can have a quadrangular shape with toothed profiles along all four sides. In this case a toothed plate itself can have one or two toothed profiles active during operation of the machine, i.e. a toothed profile in radial direction and/or a toothed profile in tangential direction with respect to the vane on which it is mounted. In case of wear of the active toothed profiles, the toothed plate can be rotated by 90° or 180° and fixed on the same vane having a new or anyway less worn toothed profile projecting from the tangential and/or radial edge of the vane.

Alternatively, a toothed plate of quadrangular shape can have only two opposite sides provided with toothed profiles. A so-realized toothed plate, in the moment the wear of the toothed profile projecting from the tangential or radial edge of the vane occurs, can be rotated by 180° only and fixed to the same vane so as to have a toothed profile on the selected operative position, i.e. radial or tangential.

A toothed plate itself can thus be used several times before requiring to be completely substituted.

In another embodiment of the present invention, several toothed plates can be mounted on each vane and provided with a single side with toothed profile. Then on each vane only one toothed plate can be mounted, with the toothed profile projecting, for example, only in the tangential direction or projecting only from the radial direction with respect to the vane on which it is mounted. Alternatively, at least two toothed plates, one with toothed profile projecting in the tangential direction and one with profile projecting in the radial direction, can be mounted.

The toothed plates are preferably unsharpened at the toothed portions. This renders safer the intervention of operators in charge of the maintenance or replacement services of the toothed plates.

Conversely to the known prior art machines, the effectiveness of the cutting means on the labels does not rely on the sharp edge of plates and knives, nor on the sharp profile of the pointed elements, which is subjected to rapid wear and needs recurring sharpening or replacements, but rather on the toothed portions of the toothed plates which forcefully impact the bottles. The unsharpened toothed plates become effective for longer, and therefore need less replacement operations.

In order to facilitate the rotation and/or replacement operations of the toothed plates on the vanes, the toothed plates are held in position on the vanes by means of a blocking device which is screw-fixed. In fact, each blocking device includes centering means projecting from a face thereof, i.e. that one facing towards the vane and the toothed plates. The centering means are provided for engaging with corresponding seats present in each of the vanes and/or in each of the toothed plates.

Preferably a single screw is used in order to render the interventions on the toothed plates quicker, whereas the blocking device allows to prevent the rotation of the toothed plates and to hold them in intimate contact with the flat vane surfaces.

In case of square-shaped toothed plates, provided with toothed profiles on two opposite sides or on all four sides of the shape, the rotation of the toothed plate by 90° or 180° needs loosening of the screw, distancing the blocking device to allow the rotation of the toothed plate, and then screwing again the screw to tighten the blocking device on the toothed plate in order to hold it in position. Anyway, also the complete replacement of the worn toothed plate with a new one needs the disassembling of only one screw.

In case of toothed plates with only one side provided with toothed profile, both the replacement and the repositioning of each toothed plate can be realized without completely removing the screw and the blocking device. In fact it is enough to loosen the screw, to space apart the blocking device for a distance equal to the thickness of the key-shaped protrusions and finally, after the toothed plates relative to the operation have been replaced or repositioned, to tighten the screw again until fixing the blocking device against the toothed plates.

The vanes are preferably mounted along the rotor with a pitch angle between 3° and 30° with respect to a plane perpendicular to the rotation axis of the agitator to facilitate the correct transit flow of containers from the inlet to the outlet. For example, the vanes mounted on the rotor in proximity of the inlet can have a greater pitch angle with respect to those mounted on the rotor in proximity of the outlet.

According to another aspect of the present invention, a method for the continuous removal of labels from the surface of plastic containers is proposed, the method comprising the steps of:
- randomly feeding the containers to a fixed treatment chamber through an inlet;
- rotating at least one agitator located, placed inside the treatment chamber, having a plurality of vanes distributed along the rotor of the agitator and provided with at least two opposite flat surfaces;
- extracting the containers from the treatment chamber through an outlet of the chamber; and
- expelling the labels removed from the surface of the containers through a portion of perforated wall of the treatment chamber.

The method according to the present invention provides for making cuts to the labels adhering to the surface of the containers using one or several toothed plates mounted in a removable way on at least one of the flat surfaces of each of said vanes.

The agitator is rotated at very high angular velocities, however not less than those needed for obtaining, at the ends of the vanes, a tangential velocity of 2.5 m/s. In particular, taking account of the dimensions of the machine and of the inertias of the rotating components, excellent results were obtained by rotating the agitator with angular velocities such as to obtain a tangential velocity, measured at the ends of the vanes, comprised between 15 and 25 m/s.

Preferably, the containers are extracted from the treatment chamber using an extraction auger arranged at the outlet.

The extraction auger is operated by an electric motor under the control of appropriate means that also enable the regulation of the stay time of the containers in the treatment chamber.

In the machine according to the present invention the treatment of the containers can be dry made, therefore without requiring the use of water or washing fluids and, accordingly, avoiding to combine the machine to all equipments and systems for the feed, filtration and disposal of the washing fluid. In this case, any solid and/or heavy contaminants that could damage the machine can be removed upstream the machine, for example using a ballistic screen. Any deposits of sand or soil adhering to the containers are detached from the containers during the transit thereof through the treatment chamber due to the high rotation speed of the agitator and the high level of rubbing of the containers against one another. Washing with aqueous solutions and detergents, if necessary, can also be carried out in the subsequent processing steps.

A machine according to the present invention can however be effectively employed also for carrying out the removal of the labels in presence of a washing fluid, preferably an unheated fluid, such as for example the one described in the European patent application No. EP-2050516 in the name of the same Applicant. Therefore such a machine needs to be combined with a plant for feeding and treating washing fluids.

BRIEF DESCRIPTION OF THE DRAWINGS

Further characteristics and advantages of the present invention will be more evident from the following description, made for illustration purposes only and without limitation, with particular reference to the accompanying schematic drawings, wherein.

DETAILED DESCRIPTION

Figure 1:
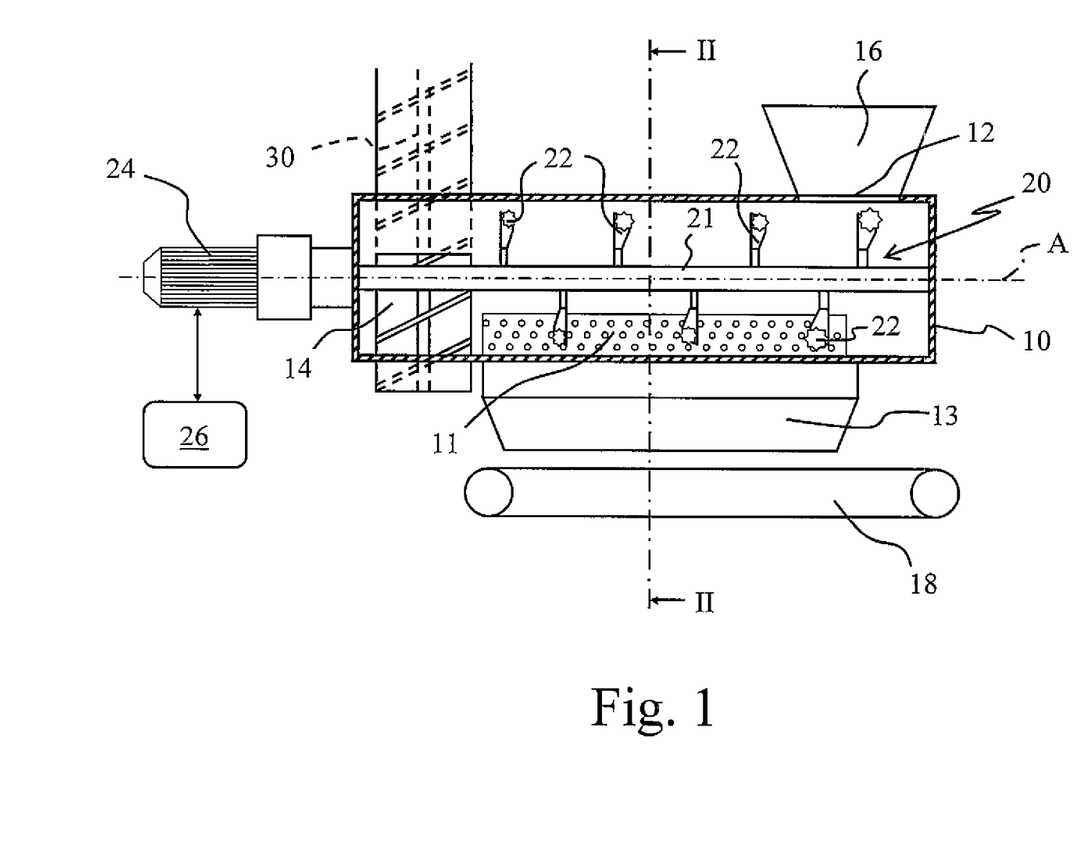
FIG. 1 is a longitudinal section view of a machine for the dry removal of the labels according to a possible embodiment of the present invention.
Figure 2:
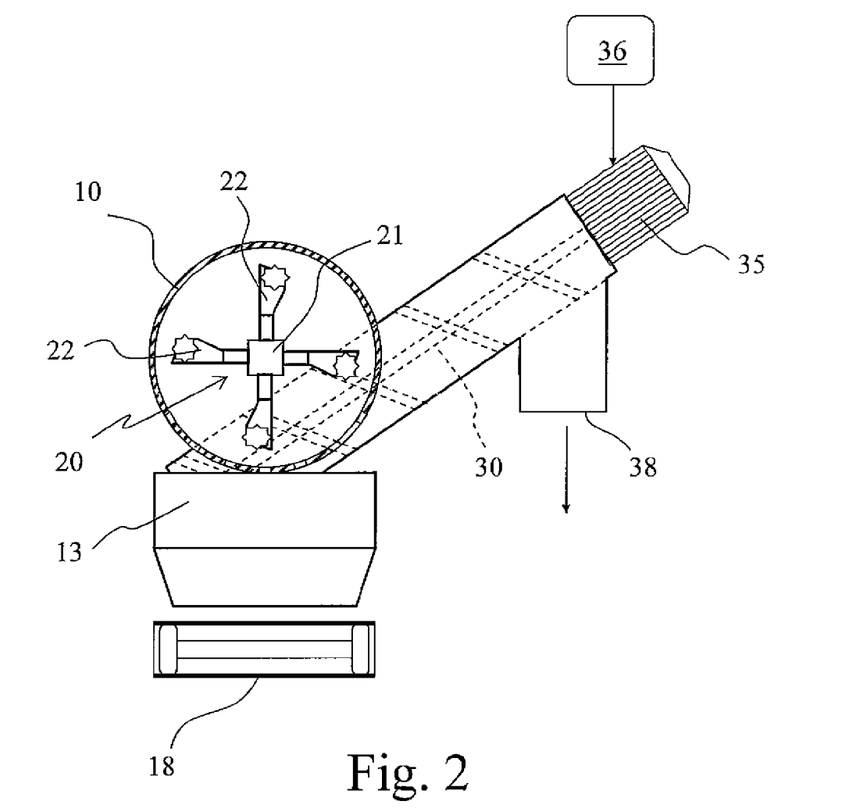
FIG. 2 is a cross section view along the plane II-II of the machine represented in FIG. 1.

With reference to FIGS. 1 and 2, a machine for the dry removal of the labels according to a possible embodiment of the present invention essentially comprises a fixed treatment chamber 10 with cylindrical shape, and an agitator 20 rotated inside the chamber 10 around an axis A coincident with that of the cylindrical chamber 10.

On the rotor 21 of the agitator 20 a plurality of agitation vanes 22 are arranged, which are oriented so as to facilitate the transit of the containers through the treatment chamber 10 from an inlet 12 to an outlet 14. The containers are fed continuously and randomly oriented through a hopper 16 and extracted continuously too from the chamber 10 by means of an auger 30.

The containers are preferably fed singularly to the treatment chamber 10, although small groups of bottles can be tolerated (for example, up to a maximum of approximately ten bottles).

The friction action between the containers is developed by the vanes 22 of the agitator 20 which rotate the bodies of the plastic containers. The rubbing of the containers against one another and against the vanes 22 produces a vigorous complementary action that leads to the removal of the labels.

The agitator 20 is operated by an electric motor 24 driven by a control unit 26. The agitator is rotated at very high angular velocities such to obtain, at the ends of the vanes 22, a tangential velocity higher than 2.5 m/s and preferably comprised between 15 and 25 m/s. For example, during the experimental trials of a machine with vanes having a length of about 75 cm, the agitator was rotated at the angular velocity of about 250 rpm obtaining a tangential velocity just under 20 m/s at the ends of the vanes 22.

The labels removed during the transit of the containers in the chamber 10, together with any contaminants, are expelled through a portion of perforated wall 11 arranged in the lower part of the treatment chamber 10. The holes of the wall 11 have predetermined dimensions so as to enable the passage of shreds of labels removed during treatment, for example holes with a diameter of approximately 50 mm, without however allowing the containers from which the labels are removed to pass through.

The labels expelled through the portion of perforated wall 11 are conveyed by a hopper 13 to a conveying system, the latter illustrated in the embodiment here represented by a conveyor belt 18, to be then disposed of or subjected to further treatment, for example to also select other potentially recyclable materials besides that of the containers, or to be compacted to reduce the overall volume thereof.

Alternatively to the conveyor belt 18 illustrated here, continuous removal of the expelled labels can also be carried out using an auger located in a tank underlying the hopper 13.

The view of FIG. 2 highlights the system for extracting the containers from the machine. In the continuous process carried out in the machine according to the present invention, due to the angle of the vanes 22 of the agitator 20, the containers reach the outlet 14 where they are extracted by the auger 30, operated by an electric motor 35.

To guarantee a constant stay time of the material in the treatment chamber 10, and therefore an optimal level of filling of the chamber itself, the extraction auger 30 is provided with a control unit 36.

The control unit 36 drives the motor 35 to automatically vary the extraction speed of the containers according to the current absorption measured on the motor 24 of the agitator 20. Due to this device it is possible to maintain the stay time of the containers substantially constant in the turbulent phase, so as to guarantee a constant result of removal of the labels regardless of the flow rate of containers entering the machine.

In other words, a certain level of filling of the treatment chamber 10 corresponds to a value of current absorbed by the motor 24 of the agitator 20. Therefore, according to the settings of the control unit 36, the extraction auger 30 modulates its speed to maintain constant the effort required by the agitator 20. This means that, although operating continuously, it is possible to maintain a required level of filling of the treatment chamber 10 which determines the stay time of the containers being treated in the chamber itself.

As very efficacious removal of the labels is found, the containers extracted via the auger 30 pass through the outlet 38 thereof and can be sent directly to the subsequent treatment steps, for example, to the step of optical selection of the recyclable materials of interest.

Figure 3:
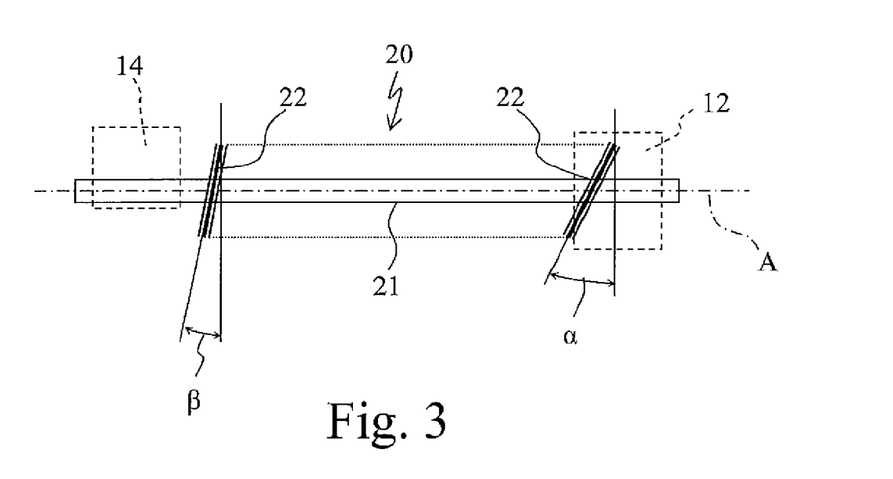
FIG. 3 is a plane view illustrating the orientation of the vanes along the rotor of the agitator.

In FIG. 3 the arrangement of the vanes 22 on the rotor 21 of the agitator 20 along the path followed by the containers from the inlet 12 to the outlet 14 (both represented with dashed lines) is schematized. In proximity of the inlet 12 the vanes 22 are mounted on the rotor 21 with a pitch angle $\alpha$ comprised between 15° and 30°, whereas in proximity of the outlet 14 the vanes are mounted on the rotor 21 with a pitch angle $\beta$ comprised between 3° and 5°. Both the angles $\alpha$ and $\beta$ are intended as measured with respect to a plane perpendicular to the axis A of the rotor 21. The vanes arranged between the two end positions along the rotor 21 can have, for example, pitch angles with values gradually moving towards those selected for the angles $\alpha$ and $\beta$.

Figure 4:
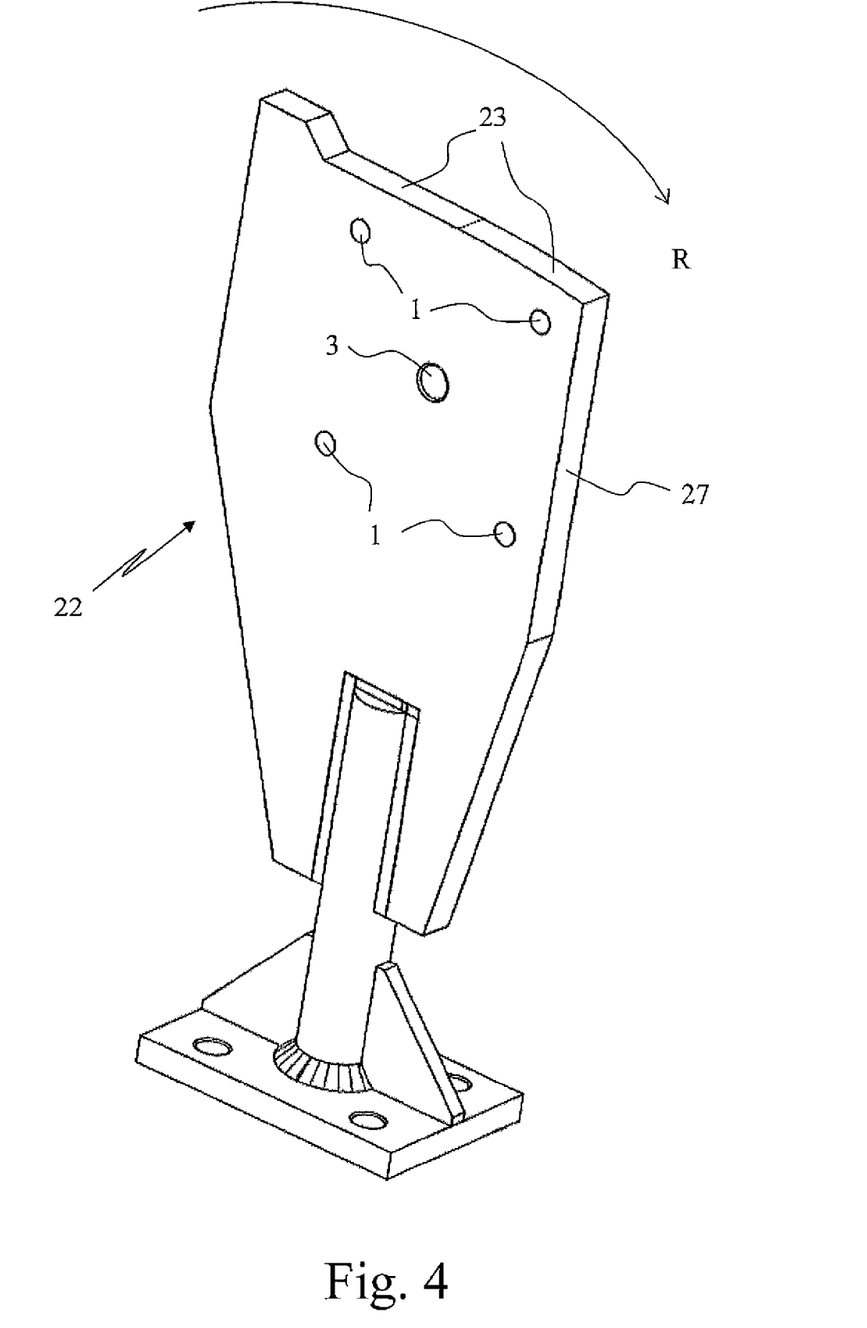
FIG. 4 shows a vane without toothed plates.

In FIG. 4 a vane 22 is represented without any toothed plates mounted thereon.

Figure 7:
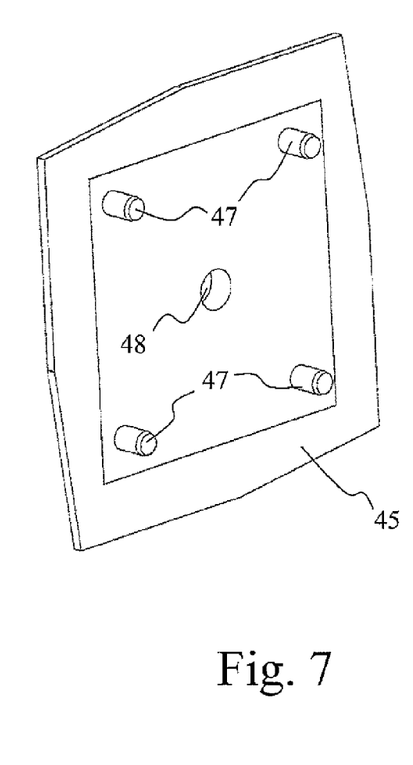
FIG. 7 is a perspective view of a blocking device for the toothed plate shown in FIG. 6.
Figure 10:
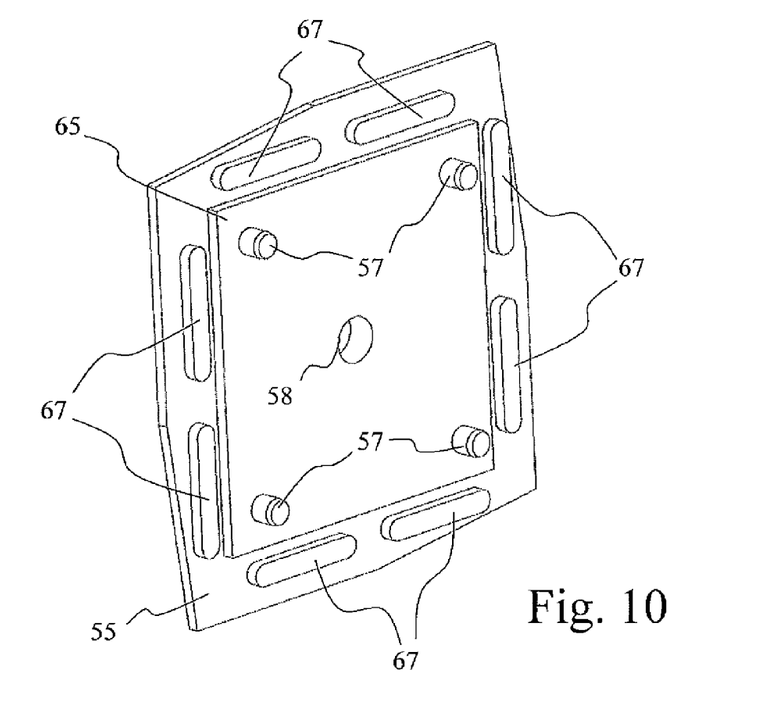
FIG. 10 is a perspective view of a blocking device for the toothed plates shown in FIG. 8.

Note that the vane has flat shape and therefore has two opposite flat surfaces. The vane 22 includes a threaded hole 3 intended for receiving in engagement a fixing screw or bolt 25 (FIGS. 5 and 8) and a plurality of holes 1 intended for receiving the anti-rotation pins 47 or 57 of the blocking devices 45 or 55 (FIGS. 7 and 10).

The arrow R in the view of FIG. 4 indicates the rotation direction of the vane 22, with respect to which a tangential edge 23 and a radial edge 27 are identified, i.e. the edges from where the "active" toothed portions of the toothed plates protrude, i.e. the toothed portions impacting the bottles during the rotation of the agitator 20.

Figure 5:
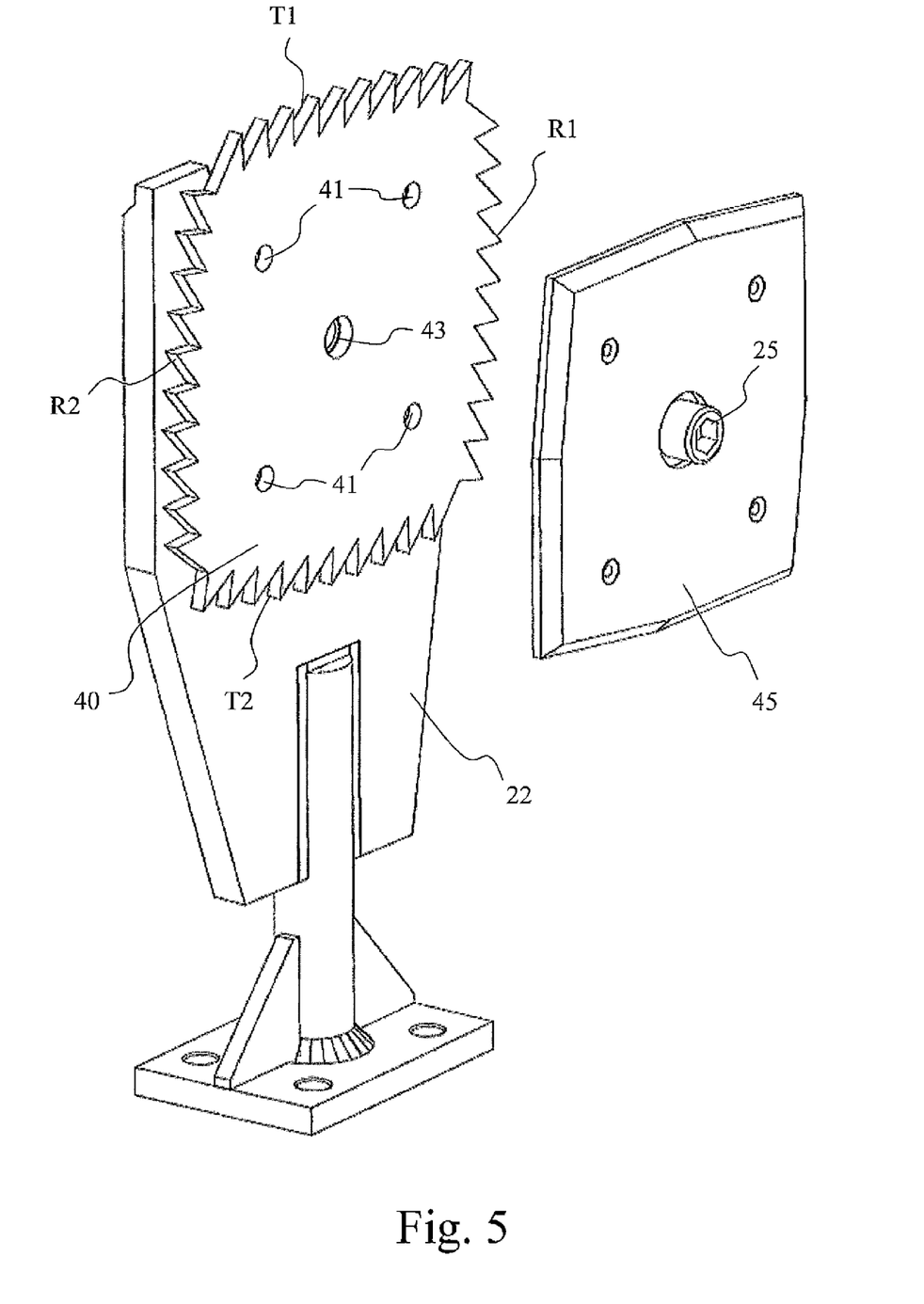
FIG. 5 is a perspective elevation view of a toothed plate mounted on a vane according to a possible embodiment of the invention.

In the view of FIG. 5 a vane 22 is illustrated on which a toothed plate 40 is mounted according to a possible embodiment of the invention. The toothed plate 40 has substantially quadrangular shape and is removably mounted on the vane 22 by a blocking device 45. The latter includes a central through hole 48 (FIG. 7) in which a fixing bolt 25 of the toothed plate 40 is inserted. The toothed plate 40 has in its turn a central through hole 43 and four through holes 41 for the anti-rotation pins 47 (FIG. 7) of the blocking device 45.

Figure 6:
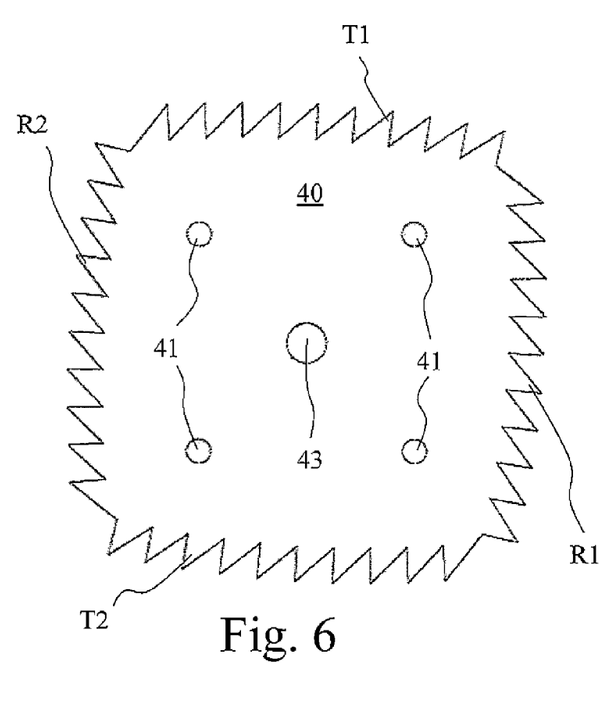
FIG. 6 shows the toothed plate of the embodiment of FIG. 5.

In the embodiment of the FIGS. 5 and 6, the toothed plate 40 has two toothed profiles T1, T2 arranged along two opposite sides of the quadrangular shape and two toothed profiles R1, R2 arranged along the other two opposite sides. The blocking device 45 for the toothed plate 40 is illustrated in FIG. 7.

This enables different assembly options of the toothed plate 40 to be chosen when one or more of the toothed profiles are worn before having to replace them. In FIG. 5, the toothed plate 40 is mounted on the vane 22 with the toothed profile T1 acting in tangential direction, whereas the toothed profile R1 is the one operating in radial direction. If both toothed profiles T1 and R1 are worn after a certain period of time, the toothed plate 40 can be rotated by 180° thus taking the profiles T2 and R2 to the operating position; the anti-rotation pins 47 of the blocking device 45 will still engage in the holes 1 of the vane 22 and in the holes 41 of the toothed plate 40.

However, if only one of the two profiles T1 or R1 of the plate 40 is more worn than the other, the toothed plate 40 can be rotated by only 90°, for example taking the toothed profile T1 or T2 to the position currently occupied in FIG. 5 by the toothed profile R1 if this is the one with the most wear. It is worth to note that all these rotation operations of the toothed plate 40 can be carried out simply by loosening the fixing screw or bolt 25, by spacing apart the blocking device 45 from the vane 22, if necessary along with the toothed plate 40 and then, once the desired rotation by 90° or 180° of the toothed plate 40 has been carried out, by tightening again the screw or bolt 25.

Figure 6A:
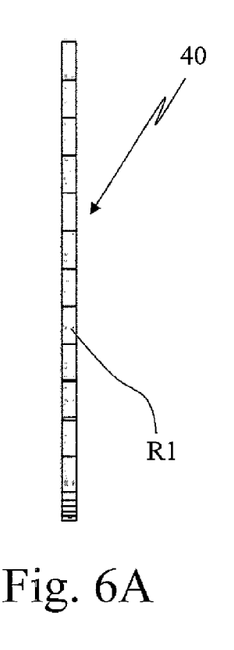
FIGS. 6A and 6B are a side view and a top view, respectively, of the toothed plate of FIG. 6.
Figure 6B:
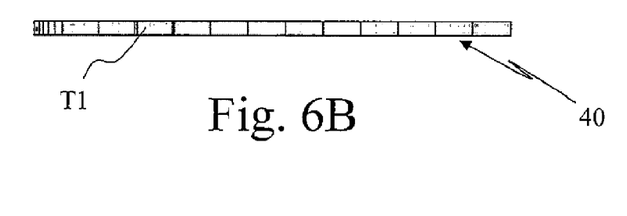

As it can be understood from the views of FIGS. 6A and 6B, the toothed profiles R1 and T1 are unsharpened; the toothed plate 40 has therefore a flat shape with same thickness in all of its sections.

Figure 8:
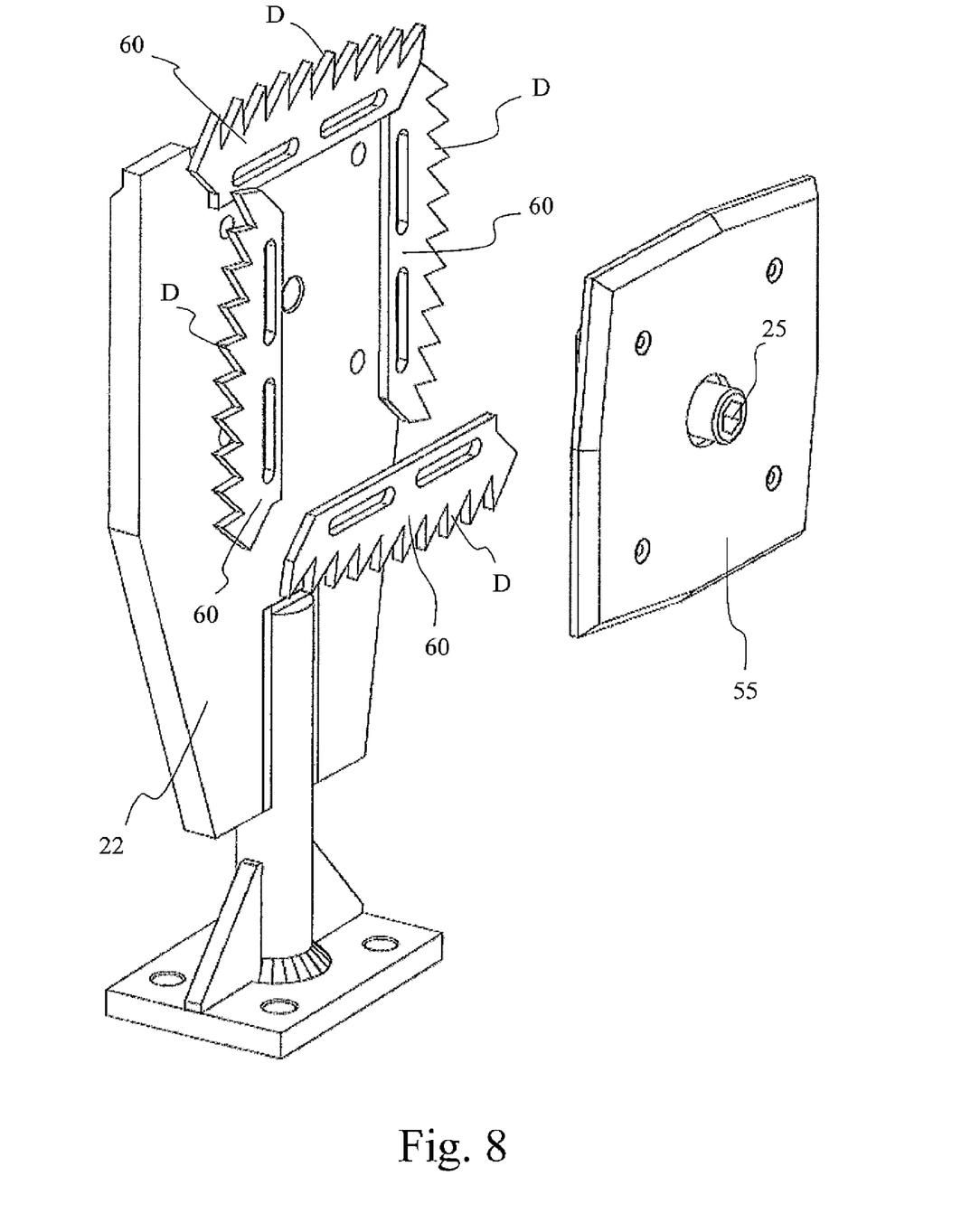
FIG. 8 illustrates a perspective elevation view of another embodiment of the invention wherein several toothed plates are provided, each having a single toothed profile, mounted on the vane of FIG. 4.
Figure 9:
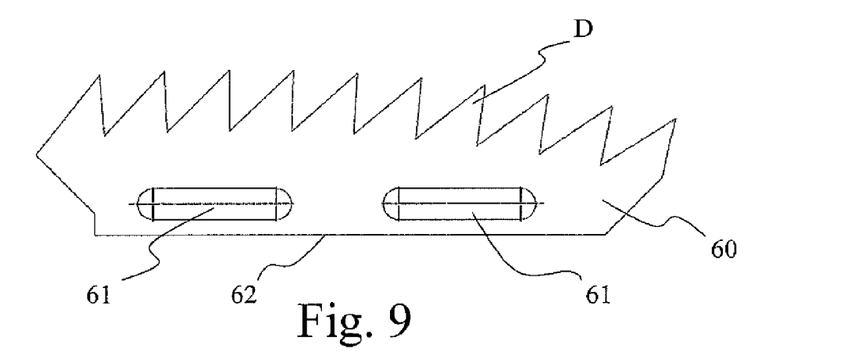
FIG. 9 illustrates one of the toothed plates of the embodiment of FIG. 8.

In the view of FIG. 8 a vane 22 is illustrated on which several toothed plates 60 are mounted according to another embodiment of the invention. With reference also to FIGS. 9 and 10, each toothed plate 60 has a single side with a toothed profile D and is provided with a couple of slots 61 in which key-shaped protrusions 67 present on the blocking device 55 are inserted. In addition to the key-shaped protrusions 67, the blocking device 55 includes a central protrusion 65 having quadrangular shape in order to provide a rest for the sides 62 of the toothed plates 60, from the opposite side with respect to the toothed portion D, and maintain the correct parallelism between the flat surface of the vane 22 and the blocking device 55 also if only one or two toothed plates 60 are mounted on the vane 22. Similarly to the blocking device 45, also the blocking device 55 comprises a central hole 58 for a screw or bolt 25 for fixing to the vane and four anti-rotation pins 57 intended for engaging in the holes 1 of the vane 22.

Figure 9A:
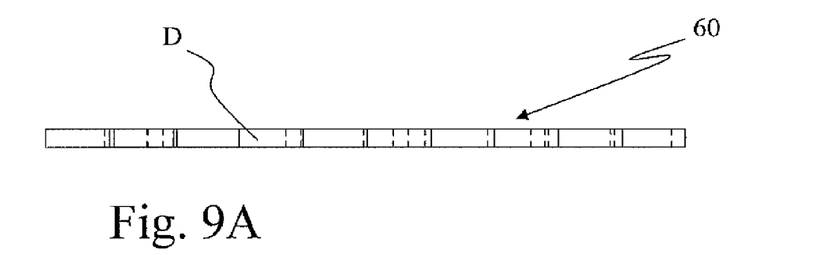
FIG. 9A is a top view of the toothed plate of FIG. 9.

As it can be understood from the view of FIG. 9A, also the toothed profile D of the toothed plate 60 is unsharpened; the vane 60 has therefore a flat shape with the same thickness in all of its sections.

This embodiment further simplifies the replacement and repositioning operations for each toothed plate 60; in particular, the replacement of a toothed plate 60 can be carried out without completely removing the blocking device 55.

Figure 11:
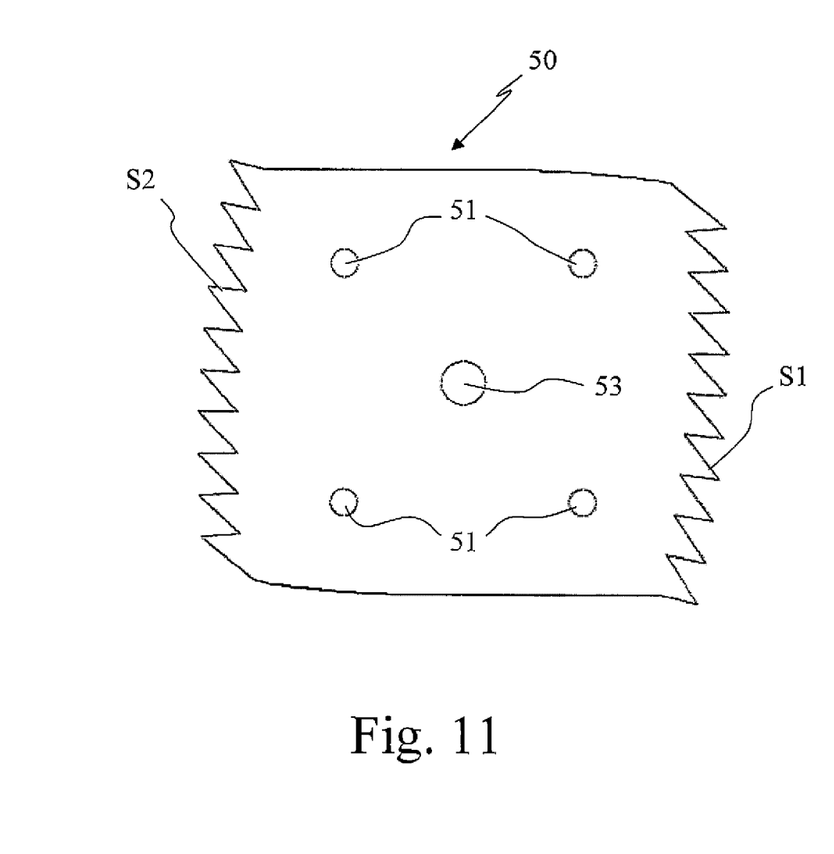
FIGS. 11 and 12 illustrate another embodiment of a toothed plate which can be mounted on the vane of FIG. 4.
Figure 12:
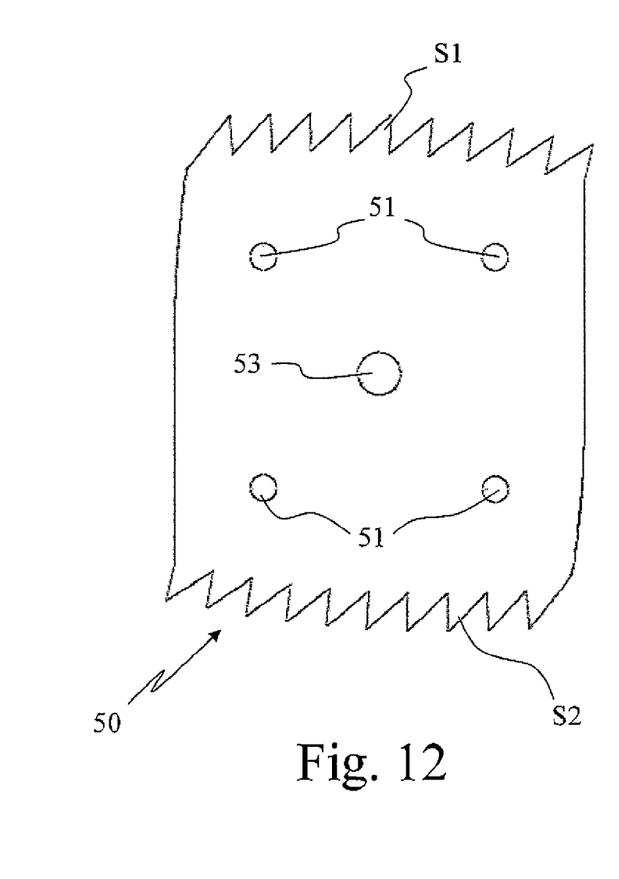

In FIGS. 11 and 12 another embodiment is illustrated of a toothed plate 50 suitable to be installed on a vane 22 such as the one shown in FIG. 4. The toothed plate 50 is provided with only two toothed edges S1 and S2 along two opposite sides of the quadrangular shape. Similarly to the toothed plate 40, the toothed plate 50 comprises a through hole 53 for a fixing bolt 25 (FIG. 5), and a plurality of holes 51 at positions corresponding to the anti-rotation pins 47 of the blocking device 45 (FIG. 7) that engage in the holes 1 of the vane 22.

This embodiment is mainly suitable to be used with the toothed profiles S1 or S2 which act only in radial direction (FIG. 1) or only in tangential direction (FIG. 12). This can be useful, for example, in case in which, along the agitator 20, only the radial (or tangential) action of the toothed plates mounted on the vanes 22 proves to be more efficacious. Similarly to the toothed plates 40 and 60, also the toothed profiles S1 and S2 of the toothed plate 50 are unsharpened; therefore, also the toothed plate 50 has flat shape with constant thickness in all its sections.

All the toothed plates 40, 50 and 60 can however be mounted at the same time on a same agitator, for example by suitably positioning them along the agitator to optimize the efficiency of the removal of the labels in the various sections of the treatment chamber.

The principles of the present invention can be equally applied also to the machines which carry out the treatment of containers by entering a washing, preferably unheated, fluid.

Figure 13:
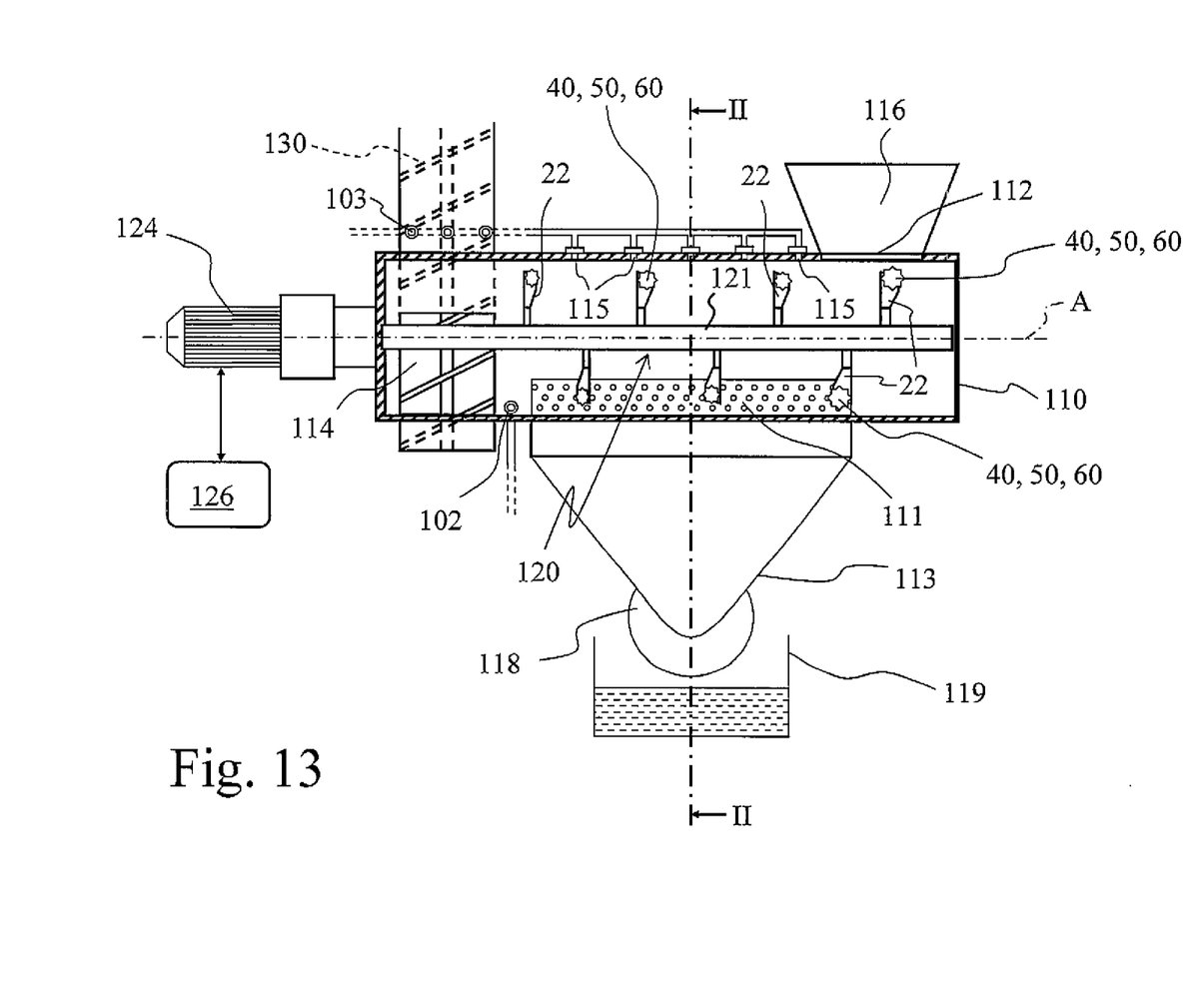
FIG. 13 is a longitudinal section view of a machine for washing and removing the labels according to a possible embodiment of the present invention.
Figure 14:
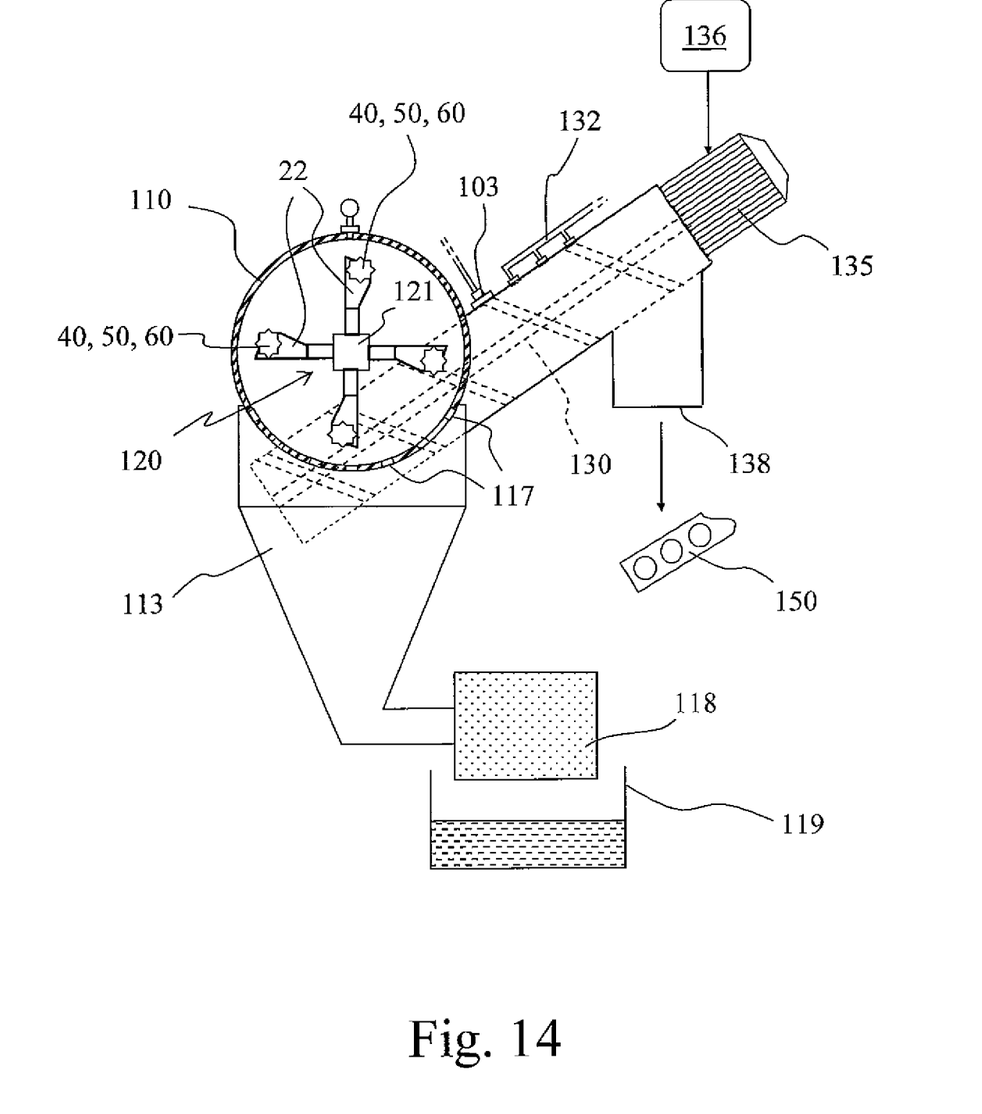
FIG. 14 is a cross section view along the plane II-II of the machine for washing and removing the labels depicted in FIG. 13.

For example, in FIGS. 13 and 14 a machine for washing and removing the labels according to the present invention is illustrated. This machine essentially comprises a fixed washing machine 110 having cylindrical shape, and an agitator 120 rotated inside the washing chamber 110 around an axis A coincident with the axis of the chamber.

On the shaft 121 of the agitator 120 a plurality of agitation vanes 22 are arranged (FIG. 4) which are oriented as those represented in FIG. 3, so as to promote the transit of the containers in the washing chamber 110 from an inlet 112 to an outlet 114. On each of the vanes 22 toothed plates 40, 50 or 60 are mounted as those described for example in FIGS. 5, 6, 8, 9, 11 and 12.

The containers are continuously fed through a hopper 116 and extracted from the chamber 110, also continuously, using an auger 130.

The containers are preferably randomly oriented and singularly fed to the washing chamber 110, although small groups of bottles can be tolerated (for example, up to a maximum of approximately ten bottles).

The aqueous solution required for the washing process is introduced in the washing chamber 110 by nozzles 115 distributed along the walls of the washing machine, preferably at the upper portion of the chamber. The aqueous solution is introduced in the washing chamber 110 at room temperature, or however at temperatures not higher than 45° C. In order to improve the washing action, the processing water can be added if necessary with chemical detergents by suitable dosing pumps (not shown).

A fraction of the washing fluid can also be introduced through one or more nozzles 102 fed at pressures higher than 80 bars, for example at a pressure of about 100 bar, to add a vigorous hydraulic action for the removal of the contaminants and labels, in addition to the mechanic action exerted by the vanes 22 and the mutual rubbing of the containers agitated in the chamber. The high pressure nozzles 102 are preferably distributed on the walls of the chamber 110 immediately upstream of the outlet 114 of the containers, or however in proximity thereof, i.e. in a point of potential build up of the containers before the extraction thereof by the auger 130.

The friction action between the containers is developed by the vanes 22 of the agitator 120 which rotate the bodies of the plastic containers. Rubbing of the containers against one another and against the washing chamber 110 causes the vigorous action of washing and removal of the labels. The agitator is operated by an electric motor 124 driven by a control unit 126.

The perforated portion 111, located in the lower part of the washing chamber 10, includes draining holes 117 with circular section having suitable diameter (for example of about 50 mm) for the discharge of solid pollutants such as stones, glasses, etc.

Through these circular holes the solid contaminants, the labels and the dirty aqueous solution are discharged and conveyed by a hopper 113 to a filter 118. The washing fluid separated from its solid particles is collected in a tank 119.

A fraction of the washing fluid in the tank 119 can be drawn and mixed if necessary with a fraction of fresh fluid to be reintroduced in the same washing chamber 110 through the nozzles 115.

The view of FIG. 14 highlights the system for extracting the containers from the washing machine. In the continuous process which is carried out in the washing machine according to the present invention, due to the angle of the vanes 22 of the agitator 120, the containers reach the outlet 114 where they are extracted by the auger 130, operated by an electric motor 135.

To guarantee a constant stay time of the material in the washing chamber 110 during the treatment step, and therefore an optimal level of filling of the chamber itself, the extraction auger 130 is provided with a control unit 136.

The control unit 136 drives the motor 135 to automatically vary the extraction speed of the containers according to the current absorption measured on the motor 124 of the agitator 120. Due to this device it is possible to maintain the stay time of the containers substantially constant in the turbulent phase, so as to guarantee an effective result of washing and removal of the labels regardless of the flow rate of the containers entering the machine.

In other words, a certain level of filling of the treatment chamber 110 corresponds to a value of current absorbed by the motor 124 of the agitator 120. Therefore, according to the settings of the control unit 136, the extraction auger 130 modulates its speed to maintain constant the effort required by the agitator 120. This means that, although operating continuously, a required level of filling of the treatment chamber 110, which determines the stay time of the containers being treated in the chamber, can be maintained constant.

The change of at least a part of the washing fluid needed to maintain constant the pollution degree in the washing chamber 110 can be carried out also with a shower 132 provided with nozzles directed to the containers extracted by the auger 130. In this case it is a fluid coming from the downstream steps, in which the pollution degree of the recovered fluid is lower than that of the washing fluid flowing in the chamber 110.

The containers extracted by the auger 130 pass through the outlet 138 thereof to be sent to subsequent treatment steps, for example to a further step of separation between the contaminants and the containers which is carried out for example through a ballistic screen 150.

On the auger 130 also high pressure nozzles 103 can be prearranged, these being fed too with pressures higher than 80 bars (for example 100 bars). Also in this case, the high pressure nozzles 103 are arranged in a position favorable to exert a vigorous hydraulic action of removal of the contaminants and labels, i.e. a position in which the containers have a limited freedom of motion.

Both the nozzles 102 arranged on the chamber 110 and the nozzles 103 arranged on the auger 130 can be fed with fresh fluid able to restore the amount of overall fluid constantly present in the chamber 110 at least partially, on the other hand letting to the nozzles 115, and in case also 132, the task of restoring the fraction of filtered and purified fluid coming, for example, from the tank 119.

Various modifications can be made to the herein depicted embodiments without departing from the scope of the present invention. For example, the control units 26 and 36, or 126 and 136, even if represented as separate units for clarity, can be integrated in a single main control unit controlling other functions of the machine or of the system in which it is installed. Furthermore, the perforated walls 11 and 111 can also comprise, in addition to the circular holes, also rectangular through holes delimited by small cylindrical bars, for example.

Furthermore, since the vanes of the agitator have two opposite flat surfaces, the toothed plates could be mounted on both the opposite surfaces of one or more vanes, for example for increasing the cutting action of the toothed plates in one or more sections of the treatment chamber.

Finally, the embodiments of the machines here represented are intended in particular for the treatment of PET bottles, but it is evident that the same principles of the present invention can be adopted for other types of containers, just as for other recyclable plastic materials.

The invention claimed is:

1. A machine for the continuous removal of labels from the surface of plastic containers, comprising:
a fixed treatment chamber having an inlet for the containers to be treated, at least one outlet for said containers with the labels removed and at least one portion of perforated wall for the expulsion of the removed labels;
at least one agitator rotating inside said treatment chamber and having a plurality of vanes distributed along the rotor of said agitator and provided with at least two opposite flat surfaces,
and means for making cuts to the labels adhering to the surface of said containers during transit thereof inside said chamber,
characterized in that said means for making cuts to the labels comprise one or more toothed plates mounted in a removable way on at least one of the flat surfaces of each of said vanes.

2. The machine according to claim 1, wherein each of said toothed plates includes at least one toothed profile projecting from the tangential edge of the vane on which it is mounted.

3. The machine according to claim 1, wherein each of said toothed plates includes at least one toothed profile projecting from the radial edge of the vane on which it is mounted.

4. The machine according to claim 1, wherein each of said toothed plates has a quadrangular shape in plan view, and wherein at least two opposite sides of the toothed plate are provided with toothed profiles.

5. The machine according to claim 1, wherein each of said toothed plates has a single side provided with a toothed profile.

6. The machine according to claim 1, wherein said toothed plates are unsharpened at the toothed portions.

7. The machine according to claim 1, wherein said toothed plates are held in position on each of said vanes through a blocking device which is fixed to the vane with at least one screw.

8. The machine according to claim 7, wherein said blocking device is fixed to the vane with a single screw.

9. The machine according to claim 1, wherein each of said blocking devices includes centering means projecting from a face thereof and adapted to engage with corresponding seats present in each of said vanes and/or each of said toothed plates.

10. The machine according to claim 1, wherein said vanes are mounted along said rotor with a pitch angle comprised between 3° and 30° with respect to a plane perpendicular to the rotation axis of the agitator.

11. A method for the continuous removal of labels from the surface of plastic containers, the method comprising the steps of:
feeding said containers in a randomly oriented way to a fixed treatment chamber through an inlet;
rotating at least one agitator located inside said treatment chamber and having a plurality of vanes distributed along the rotor of said agitator and provided with at least two opposite flat surfaces;
extracting said containers from said treatment chamber through an outlet of said chamber; and
expelling said labels removed from the surface of said containers through a portion of perforated wall of said treatment chamber,
characterized by making cuts to the labels adhering to the surface of said containers using one or more toothed plates mounted in a removable way on at least one of the flat surfaces of each of said vanes.

12. A method according to claim 11, wherein said agitator is rotated at a speed such as to obtain a tangential velocity, measured at the ends of said vanes, not lower than 2.5 m/s.

13. The method according to claim 11, wherein said agitator is rotated at a speed such as to obtain a tangential velocity, measured at the ends of said vanes, comprised between 15 and 25 m/s.

14. The method according to claim 11, wherein said containers are extracted from the treatment chamber using an extraction auger arranged at said outlet.

15. The method according to claim 14, wherein said extraction auger is operated by an electric motor, and wherein the extraction speed of said containers from said treatment chamber is regulated by appropriate control means.

16. The method according to claim 11, wherein the treatment of said containers is carried out without feeding fluids into the treatment chamber.

17. The method according to claim 11, wherein the treatment of said containers is carried out by feeding at least one washing fluid into the treatment chamber.

* * * * *